United States Patent
Sabin et al.

(10) Patent No.: US 8,438,610 B2
(45) Date of Patent: May 7, 2013

(54) IDENTITY-BASED ADDRESS NORMALIZATION

(75) Inventors: Jason Allen Sabin, Lehi, UT (US); Stephen R. Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 881 days.

(21) Appl. No.: 11/863,392

(22) Filed: Sep. 28, 2007

(65) Prior Publication Data

US 2009/0089857 A1    Apr. 2, 2009

(51) Int. Cl.
| G06F 17/00 | (2006.01) |
| G06F 15/173 | (2006.01) |
| G06F 3/00 | (2006.01) |

(52) U.S. Cl.
USPC ............... 726/1; 709/223; 709/224; 715/744

(58) Field of Classification Search ............... 726/1–21
See application file for complete search history.

(56) References Cited

U.S. PATENT DOCUMENTS

| 6,615,242 B1 | 9/2003 | Riemers |
| 7,051,368 B1 | 5/2006 | Howard et al. |
| 7,058,633 B1 | 6/2006 | Gnagy et al. |
| 2002/0087573 A1* | 7/2002 | Reuning et al. ............... 707/102 |
| 2006/0059196 A1* | 3/2006 | Sato et al. .................. 707/104.1 |
| 2006/0218143 A1 | 9/2006 | Najork |
| 2006/0265345 A1 | 11/2006 | Christian et al. |
| 2007/0118803 A1* | 5/2007 | Walker et al. ................. 715/744 |
| 2007/0124500 A1 | 5/2007 | Bedingfield et al. |
| 2007/0136279 A1 | 6/2007 | Zhou et al. |
| 2007/0271371 A1* | 11/2007 | Singh Ahuja et al. ........ 709/224 |
| 2007/0283000 A1* | 12/2007 | Proux et al. ................... 709/224 |

FOREIGN PATENT DOCUMENTS

WO    WO-2004114614 A    12/2004

OTHER PUBLICATIONS

Lee, Sang H., et al., "On URL Normalization", *Lecture Notes in Computer Science, Computational Science and Its Applications ICCSA 2005*, (2005),1076-1085.
Nottingham, Mark , "urlnorm.py—URL normalisation routines", http://www.mnot.net/python/urlnorm.py, (Copyright 1999-2002).
Schonfeld, Uri , et al., "Do not Crawl in the DUST: Different URLs with Similar Text—Extended Abstract", *WWW 2006*, May 23-26, 2006, Edinburgh, Scotland., (2006),1-2.
"European Application Serial No. EP 08 16 4542, Search Report dated Mar. 30, 2009", 4 pgs.

* cited by examiner

*Primary Examiner* — Ashok Patel
*Assistant Examiner* — Evans Desrosiers
(74) *Attorney, Agent, or Firm* — Barry N. Young (57) ABSTRACT

In various embodiments, techniques for identity-based address normalization are provided. A principal attempts to access a resource via a principal-supplied address. A principal identity for the principal is used to acquire one or more address patterns. The principal-supplied address is compared against the one or more address patterns and when a match is detected, the principal-supplied address is normalized according to policy associated with the matched pattern. Additional access limitations and security restrictions are then enforced in response to the normalized address.

25 Claims, 5 Drawing Sheets

IDENTITY-BASED ADDRESS NORMALIZATION

BACKGROUND

The Internet continues to have explosive growth. Virtually every business and service has a World-Wide Web (WWW) site and offers some kind of information over the WWW. In many cases, consumers and employees of enterprises can conduct business and affairs via software applications available over the WWW.

Typically, an enterprise constructs its WWW site as a centrally accessible page where other sites or sub pages are accessible from that main page or site. The pages are often organized hierarchically, such as in a directory. Some sub directories or pages may require authentication or may have different varying levels of security before access is properly granted.

Recognizing that WWW sites are generally constructed this way, hackers have attempted to break out of a controlled WWW session and directly access directories or paths that they should not have access to. This permits hackers to access protected software of an enterprise and/or to execute malicious programs on the WWW sites.

To deal with this, enterprises have developed Uniform Resource Locator (URL) normalization schemes. With this, an URL pattern entered by a user is normalized into a specific WWW directory or path and any needed access control is applied. For example, a request from a user such as, "HTTP GET /validpath/../admin" may get normalized to "HTTP GET /admin." Once the URL is normalized it can be evaluated to determine if this particular path is allowed for a given user.

The problem with this approach, as it exists today, is that it is largely not flexible and dynamic. In other words, each time a particular pattern is detected it is manually noted in a service that controls the WWW site. Thus, it takes time before the pattern is enforced on the WWW site and requires a specific administrator to implement and hardcode the pattern. Moreover, hackers are regularly developing masking techniques to avoid URL normalization, some of which are difficult to detect and address.

Another problem is that there is no ability to relax normalization for specific users or for specific software services. Moreover, there is no ability to increase pattern recognition in response to a particular software service being requested. Thus, there is little to no customization for URL normalization techniques in the industry.

Accordingly, what are needed are more flexible and customized mechanisms for URL normalization.

SUMMARY

In various embodiments, techniques for identity-based address normalization are provided. More specifically, and in an embodiment, a method is provided for identity-based address normalization. An electronic address for a resource is received from a principal. A resource identity for the resource and a principal identity for the principal are resolved. A set of patterns that the electronic address can be represented as is determined in response to at least one of the resource identity and the principal identity. Next, the electronic address is attempted to be matched against the set of patterns, when policy dictates, and the electronic address is normalized in response to a matched pattern into a normalized address. Finally, one or more actions are enforced against the principal before directing the resource to the resource for access in response to the normalized address.

DETAILED DESCRIPTION

The term "resource" as used herein refers to an electronic entity, an application or set of applications, a data store, a path to a set of other resources, a user, a proxy, a directory, a service, or physical devices such as computers or peripherals etc. Resources may represent physical or logical entities.

In an embodiment, a "principal" is a specific type of resource, such as a user or an automated service that assumes its own unique identity within a given processing context or environment. That identity can be authenticated via credentials so that a given resource can be assured that a particular principal is who it purports to be and so that the principal and actions of the principal can be authorized and trusted.

An identity refers to an electronic identifier, attribute, or representation for a resource (e.g., physical and logical). An identity may be assigned to a resource after authentication. An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

The terms "remote" and "local" are used throughout this disclosure. These terms are relative terms that define a particular resource as being local or remote to another resource. Something is considered remote if that something exists over a wide area network (WAN) in a different environment entirely from that of something else to which it is being compared.

A "pattern" refers to hard coded or variable information that defines an address to a resource. In an embodiment, the pattern is a regular expression. In some cases, the pattern can include constant and hard coded information along with variable and regular expression information.

Of course, the embodiments of the invention can be implemented in a variety of architectural platforms, proxies (reverse, forward, and/or transparent) operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Figure 1:
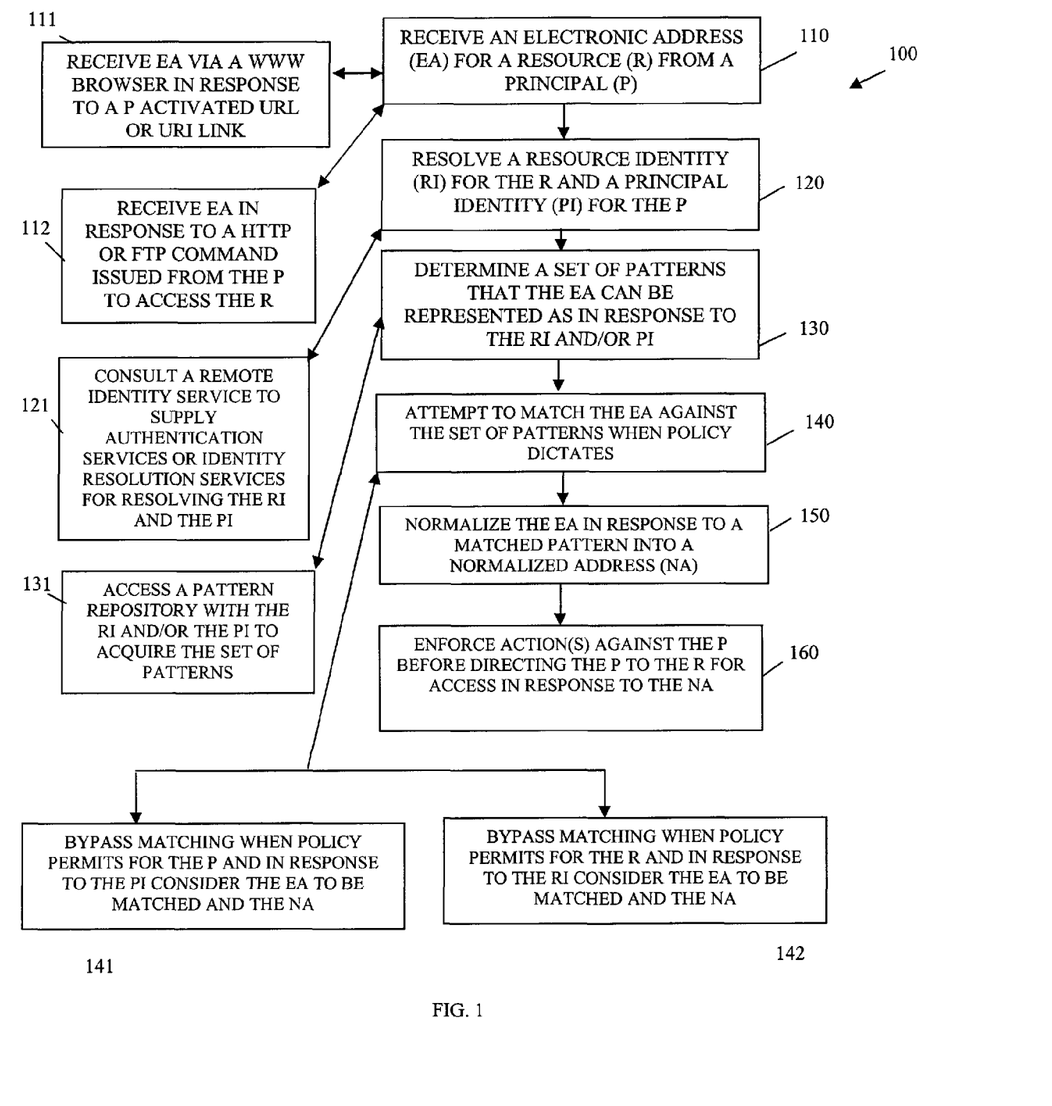
FIG. 1 is a diagram of a method for identity-based address normalization, according to an example embodiment.

FIG. 1 is a diagram of a method 100 for identity-based address normalization, according to an example embodiment. The method 100 (hereinafter "address normalization service") is implemented as instructions in a machine-accessible and readable medium. The instructions when executed by a machine perform the processing depicted in the FIG. 1. The address normalization service is also operational over and performs within a network. The network may be wired, wireless, or a combination of wired and wireless.

Initially, a principal (e.g., user or automated service) dynamically submits an address for a resource. The principal is not aware of the processing associated with the address normalization service. In fact, the principal believes that it is directly contacting the resource via the address. In an embodiment, this interaction occurs via a browser over the World-Wide Web (WWW) and the Internet, via a principal activated or supplied Uniform Resource Locator (URL) link or via a Universal Resource Identifier (URI) link. In another embodiment, the principal uses Hypertext Transfer Protocol (HTTP) or File Transfer Protocol (FTP) commands to supply the address over a Wide-Area Network (WAN) connection, such as the Internet.

At 110, the address normalization service receives an electronic address for a resource. The electronic address (herein after "address") may be represented in variable format or hard coded format or a combination of both. In some cases, the address is percent encoded. The address is supplied by a requesting principal (user or automated service) that desires to access the resource. It is noted that the resource may itself be a path or a directory to a set of additional resources.

According to an embodiment, at 111, the address normalization service receives the address from the principal via a World-Wide Web (WWW) browser in response to a principal activated or supplied Uniform Resource Locator (URL) link or a Universal Resource Identifier (URI) link.

In another embodiment, at 112, the address normalization service receives the address from the principal in response to a Hypertext Transfer Protocol (HTTP) command or a File Transfer Protocol (FTP) command. The commands may be issued within a browser or entirely separate and outside the context of a WWW browser using an Internet connection to issue the HTTP or FTP commands for the resource over a Wide-Area Network (WAN) connection.

It is noted, that the principal may be entirely unaware of the presence and actions of the address normalization service. That is, in some cases, the address normalization service intercepts requests or commands that the principal directs to the resource using the address supplied by the principal. The address normalization service may be viewed in these cases as operating as a reverse proxy on behalf of the resource and other resources. In an embodiment, the resource and other resources that the address normalization service acts as a reverse proxy for are organized hierarchically in directories via a root WWW site.

At 120, the address normalization service resolves a resource identity for the resource being referenced by the principal-supplied address and the address normalization service resolves a principal identity for the principal. The address supplied by the principal is normalized to the resource or a location for retrieving the resource in response to an identity for the principal and/or an identity for the resource. It is noted, that the resource identity does not have to be unique. In other words, the identity for the resource may just identify a particular class of resources associated with the resource that the principal is trying to reference. Moreover, in some cases, a resource may be duplicated and may be available from a variety of disparate and/or duplicated processing environments.

According to an embodiment, at 121, the address normalization service consults a remote or external identity service to supply authentication services or identity-resolution services for the resource and/or the principal. Example identity services that can be used to achieve these were discussed and incorporated by reference herein and above. The address normalization service uses the identities of the resource and the principal to determine what patterns are to be compared and policies applied to the address supplied by the principal for the resource.

At 130, the address normalization service determines a set of patterns that the principal-supplied address can be represented as; this is done in response to the principal identity, the resource identity, or a combination of both the principal identity and the resource identity. That is, the set of patterns are selected and determined in response to one or more of the identities.

In an embodiment, at 131, the address normalization service accesses a pattern repository with the resource identity and/or principal identity to specifically acquire the set of patterns.

At 140, the address normalization service attempts to match the principal-supplied address against the patterns that comprise the set of patterns. This is done in response to the dictates of policy. For example, some patterns that use percent encoding or "../" representation may be forbidden in the principal-supplied address for the resource for certain principals, while other principals may be permitted to use such patterns in their address being supplied for the resource. Policy may be use to drive the matching process.

As another example, at 141, the address normalization service may entirely bypass the matching in response to a policy that permits the principal to use any address format for accessing the resource. This is done in response to the principal identity and the address normalization service can consider the principal-supplied address to be matched and to be the normalized address when the policy permits such bypassing of the matching process. The matching essentially takes place but is trumped or overridden based on rights, roles, or privileges of the principal determined via the principal identity and the policy. The principal-supplied address becomes the normalized address in such a situation.

Similarly, at 142, the address normalization service may entirely bypass the matching in response to a policy that permits the resource to use or be accessed via any address format. Again, this is done in response to the resource identity and the address normalization service can consider the principal-supplied address to be legitimately matched and to be the normalized address. This is an override feature based on policy associated with the resource identity.

In essence, the policy can be used to enhance security or decrease security with respect to address normalization in response to the identities of the principal and the resource.

At 150, the address normalization service normalizes the principal-supplied address based on matching it to a pattern and then takes an action to normalize that address into a normalized address. The normalized address is recognized by the resource and may trigger additional security and access restriction processing by the resource or other services associated with the resource.

In some cases, at 160, the address normalization service enforces one or more actions against the principal before directing the principal to the resource for access. Again, this is done in response to the actions being associated with the normalized address. So, the address normalization service does not have to maintain a sleuth of potential ways that the resource can be addressed or accessed; rather the normalized address provides a central mechanism for achieving this and principal-supplied addresses are transformed to the normalized format in response to identity-based patterns and policy.

The processing of the address normalization service is beneficial for a variety of reasons. First, hackers that attempt to bypass the normal security enforcement associated with a resource by supplying a complicated variable expression address will not be able to gain access if the identities of the hackers do not permit the patterns being used by the hackers. Second, patterns are identity based, so a trusted identity can use more relaxed access mechanisms to access the address. This may be useful when programming is being used by a trusted identity to dynamically and automatically access the resource, such that a complicated and variable expression format for the address is needed. Third, patterns can be easily added and removed in a dynamic and real-time fashion permitting more flexible address normalization.

The techniques of the address normalization service are particularly useful with URL or URI normalization procedures; although it is to be understood that the techniques may be used in other scenarios as well, such as when scripts or principals are using specific protocols having their own proprietary addressing procedures and syntax for referencing and accessing resources.

Figure 2:
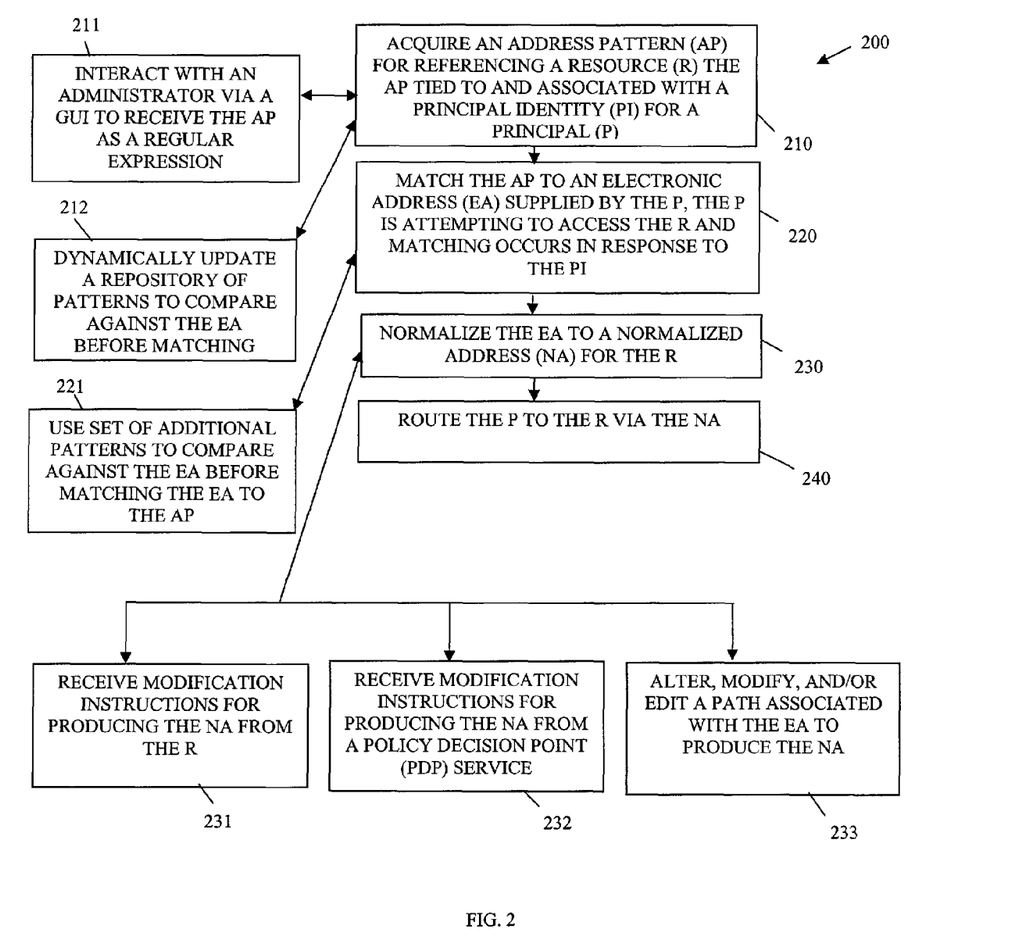
FIG. 2 is a diagram of another method for identity-based address normalization, according to an example embodiment.

FIG. 2 is a diagram of another method 200 for identity-based address normalization, according to an example embodiment. The method 200 (hereinafter "identity-based address normalization service") is implemented as instructions in a machine-accessible and readable medium. The instructions when executed by a machine perform the functions depicted in the FIG. 2. The processing is also operational over and performs within a network. The network may be wired, wireless, or a combination of wired and wireless. The identity-based address normalization service presents an alternative and in some ways enhanced perspective of the address normalization service represented by the method 100 of the FIG. 1.

At 210, the identity-based address normalization service acquires an address pattern for referencing a particular resource. The address pattern is tied to and associated with a principal identity associated with a principal. In some cases, the address pattern may be tied to or associated with a resource identity associated with the particular resource. The address pattern itself may be tied to or linked to multiple different principal or resource identities; however, acquisition of the linkage between the address pattern and the resource is done via a particular identity for the principal or the resource. Thus, this is an identity-based solution to acquiring the address pattern for referencing the resource.

According to an embodiment, at 211, the identity-based address normalization service dynamically interacts with an administrator via a graphical user interface (GUI) service to receive the address pattern. The address pattern may be defined by the administrator as a regular expression. A regular expression can be a combination of variable and/or hard coded elements that define an acceptable format for the address pattern. In the past, the only mechanism for defining a pattern was by hard coded inclusion by one that knew where and how to insert such a new pattern. Now, a GUI service permits an administrator to dynamically and in real time define the pattern and in a regular expression format. The changes can be immediately applied and used by the identity-based address normalization service as well, which was not possible in the past.

In an embodiment, at 212, the identity-based address normalization service dynamically and in real time updates a repository of patterns to compare against the principal-supplied address before attempting to match the address against the address pattern. In other words, changes made by an administrator that are committed before the matching occurs can be used to dynamically update a repository having the patterns and interrupt the matching process to use the most-recent and real-time version of the patterns.

At 220, the identity-based address normalization service matches the address pattern to the principal-supplied address. The principal is attempting to reference and access the resource via the address that the principal supplies. The matching occurs in response to the principal's identity as well. In other words, the address pattern is selected for the matching in the first instance based on the principal identity. Therefore, the address pattern that is compared and matched is identity-based.

According to an embodiment, at 221, the identity-based address normalization service uses a set of additional patterns to compare against the principal-supplied address before the match actually occurs. In other words, an entire set of principal-specific patterns may be used with the address pattern before a determination is made at 220 that it is the address pattern that matches the format of the principal-supplied address. Matching is not exact, although it can be, in other words a pattern may be a variable regular expression that the principal-supplied address conforms to.

At 230, the identity-based address normalization service normalizes the principal-supplied address to a normalized address for accessing the resource. This normalization includes a variety of benefits, such as but not limited to permitting security and access services to process against principals and their requests when they address the resource via the normalized address. Thus, this is not just transforming one format to another format, this permits designated services to process when the resource is accessed via the normalized address and permits different addressing formats to represent different services that can process before a resource is accessed. This can affect security, auditing, load balancing, etc. with respect to the resource.

In an embodiment, at 231, the identity-based address normalization service receives modification instructions for producing the normalized address from the resource itself. In another case, at 232, the identity-based address normalization service receives modification instructions for producing the normalized address from a policy decision point (PDP) service.

In still another embodiment, at 233, the identity-based address normalization service alters, modifies, and/or edits a path associated with the principal-supplied address to produce the normalized address. As one particular example, suppose the principal is actually attempting to access a different resource or path entirely via the principal-supplied address, and rather than permit or deny access, the identity-based address normalization service can simply edit the path for achieving access to an acceptable resource. Again, the identity of the principal, the identity of the resource, and policies can all interplay to define when scenarios such as this occur.

At 240, the identity-based address normalization service dynamically routes the principal to the resource via the normalized address. This particular path for access the resource via the normalized address may entail its own customized and specific services that are used to enforce security, access control, auditing compliance, etc. In essence, the identity-based address normalization service is controlling the path by which the principal can access the resource by altering the principal-supplied address to be the normalized address, and that is achieved, at least in part, in response to the identity of the principal. That is, the normalization is customized for a particular principal via that principal's identity.

Figure 3:
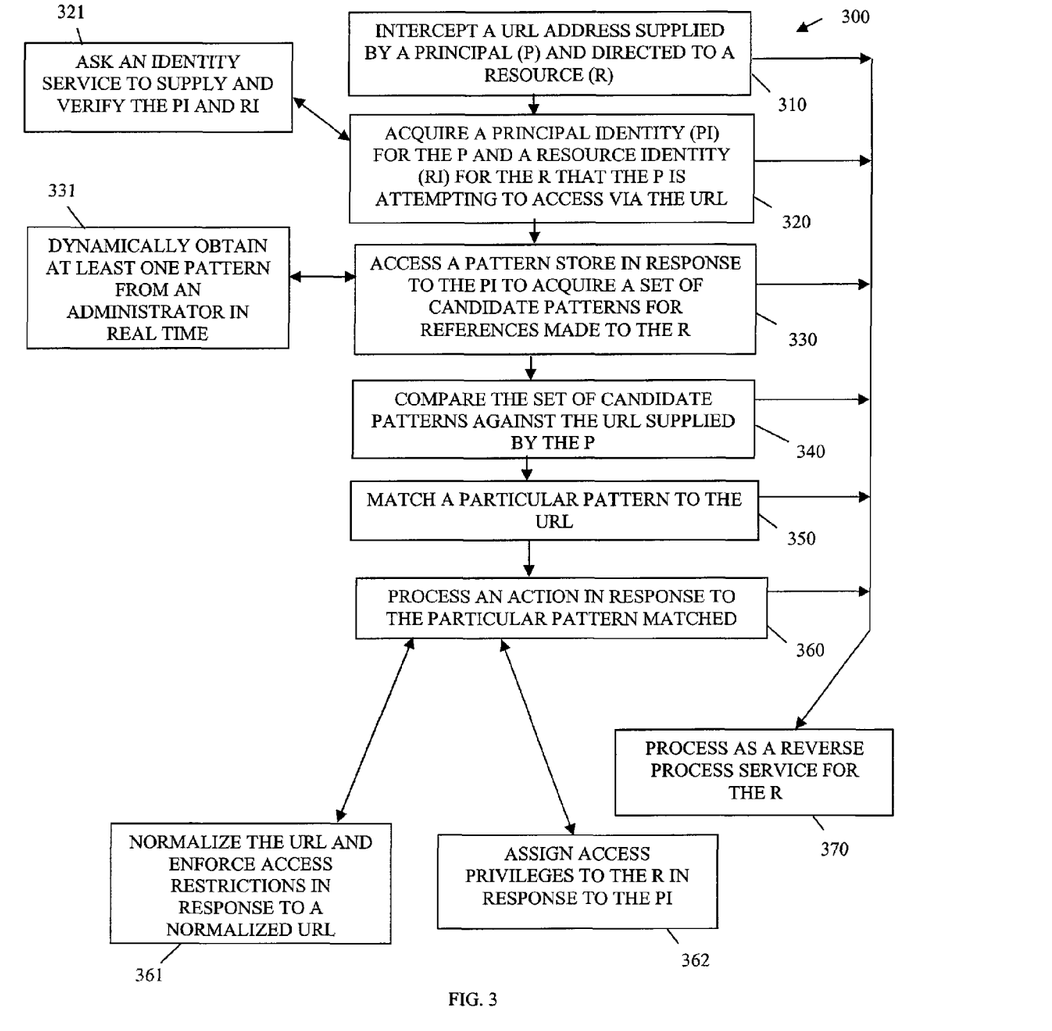
FIG. 3 is a diagram of yet another method for identity-based address normalization, according to an example embodiment.

FIG. 3 is a diagram of yet another method 300 for identity-based address normalization, according to an example embodiment. The method 300 (hereinafter "URL address normalization service") is implemented as instructions in a machine-accessible and readable medium. The instructions when executed by a machine perform the functions depicted in the FIG. 3. The processing is also operational over and performs within a network. The network may be wired, wireless, or a combination of wired and wireless. The URL address normalization service presents a particular WWW and Internet-based embodiment of the address normalization service represented by the method 100 of the FIG. 1 and the identity-based address normalization service represented by the method 200 of the FIG. 2.

At 310, the URL address normalization service intercepts a URL address or link reference (herein after just "URL") supplied by a principal and directed to a resource. The URL represents a path that the principal wants to use for accessing the resource over the Internet.

At 320, the URL address normalization service acquires a principal identity for the principal and a resource identity for the resource, which the principal is attempting to access via the URL.

According to an embodiment, at 321, the URL address normalization service asks or dynamically interacts with a remote or external identity service to supply and/or verify the principal identity and the resource identity. Example identity services for achieving this were discussed above and incorporated by reference herein and above.

At 330, the URL address normalization service accesses an address pattern store in response to the principal identity and/or resource identity for purposes of acquiring a set of candidate patterns for permissible references that can be made to the resource by the principal.

In an embodiment, at 331, the URL address normalization service dynamically and in real time obtains at least one pattern of the set of candidate patterns from an administrator. The manner in which this can be achieved was discussed above with reference to the method 200 of the FIG. 2. This dynamically acquired pattern can be immediately and in real time updated to the address pattern store for immediate use by the URL address normalization service.

At 340, the URL address normalization service compares each pattern in the set of candidate address patterns against the principal-supplied URL. At 350, the URL address normalization service matches a particular pattern to the URL. It is noted that should there be no match at all then, policy may drive the actions of the URL address normalization service to provide a particular default address, deny access, permit the principal-supplied URL to proceed as if it were matched for a principal identity with the proper access rights, etc.

At 350, the URL address normalization service processes one or more actions in response to the particular pattern matched. In this case, the address supplied by the principal is normalized to a particular URL path that policy dictates the principal use when accessing the resource being requested. Any security, access control, etc. services that are assigned with that normalized URL path are then processed before the principal is given access to the resource.

In an embodiment, the URL address normalization service is implemented and processed as a reverse proxy on behalf of the service over the WWW that the principal accesses via a WWW browser.

Figure 4:
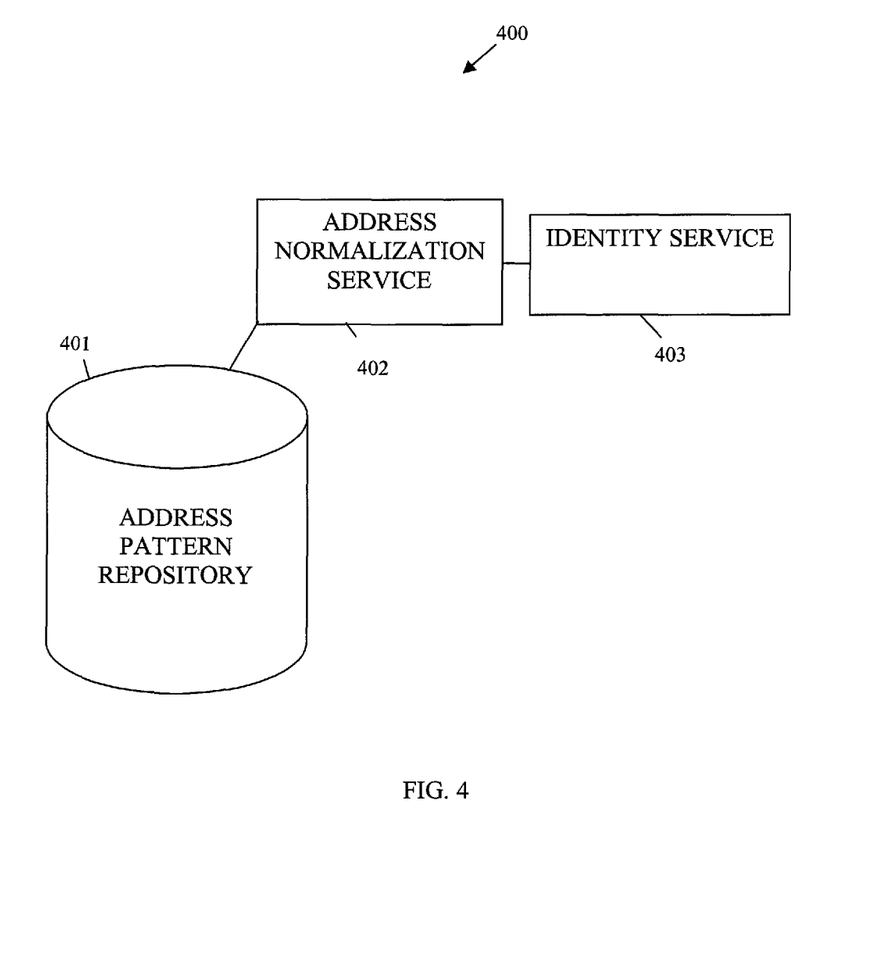
FIG. 4 is a diagram of identity-based address normalization system, according to an example embodiment.

FIG. 4 is a diagram of identity-based address normalization system 400, according to an example embodiment. The identity-based address normalization system 400 is implemented as instructions in machine-accessible and readable media and is to process on one or more machines over a network. Thus, the identity-based address normalization system 400 is operational over and performs within a network. The network may be wired, wireless, or a combination of wired and wireless. The identity-based address normalization system 400 implements among other things the methods 100, 200, and 300 of the FIGS. 1-3, respectively.

The identity-based address normalization system 400 includes an address pattern repository 401 and an address normalization service 402. In some embodiments, the identity-based address normalization system 400 may also include an identity service 403. Each of these and their interactions with one another over a wide area network, such as a WAN connection, is now discussed in turn.

The address pattern repository 401 is implemented in a machine-accessible medium and is to process on a machine (computer, processing device, etc.) over a network connection. The address pattern repository 401 is accessible to the address normalization service 402, and the address normalization service 402 processes address patterns included in the address pattern repository.

The address pattern repository 401 includes address patterns associated with network paths for accessing a resource. Each pattern included in the address pattern repository 401 may include variable information that is resolved at run time when the address is resolved and/or may include constant information. In some cases, the entire pattern or just portions of the pattern may be written in a grammar format, such as a regular expression.

Within the address pattern repository 401 patterns are associated with particular principals and particular resources via identity references for the principals and the resources. Thus, when the address normalization service 402 queries the address pattern repository 401 for one or more patterns, the address normalization service 401 uses as search terms or constraints the identity of the requesting principal and/or the identity of the resource being requested.

According to an embodiment, at least some of the patterns included in the address pattern repository 401 are defined via a graphical user interface (GUI) service by an administrator and dynamically updated to the address pattern repository 401 and made immediately available to the address normalization service 402 for consumption. In this manner, patterns are custom defined and dynamically implemented, which was not possible with past approaches.

In an embodiment, a principal supplies URL or URI links or address paths for the resources that the principal desires via a WWW browser. These are then compared via the address normalization service 402 to address patterns included in the address pattern repository 401; matches result in actions that produce a normalized address. That normalized address path is then supplied to the principal and any services associated with that path are processed before or while the principal accesses the resource.

The address normalization service 402 is implemented in a machine-accessible and readable medium and is to process on a machine of the network. Example processing associated with the address normalization service 402 was presented in detail above with reference to the methods 100, 200, and 300 of the FIGS. 1-3, respectively.

The address normalization service 402 processes principal-supplied addresses for resources by querying the address pattern repository 401 using principal identities for the requesting principals and in some cases resource identities for the resources being requested. This results in selective and identity-based address patterns being returned from the address pattern repository 401. The address normalization service 402 then attempts to match these address patterns to the principal-supplied addresses and when matches occur the principal-supplied addresses are normalized into normalized addresses and policies applied before the principals are forwarded to the resources associated with the normalized addresses.

In essence, the path over which the principals are permitted to access the resource are controlled and normalized according to identity-based restrictions and policies. According to an embodiment, at least one policy assigns access rights to the resources or assigns roles to the principals for accessing the resources.

In an embodiment, the identity-based address normalization service 400 also includes an identity service 403. Example identity services 403 were supplied above and incorporated by reference herein. The identity service 403 permits the address normalization service 402 to have principal and resource identities resolved and/or verified for any given principal-supplied address. This permits an added level of security assurance by having a third-party provide authentication and identity resolution services that are separate and apart from the address normalization service 402.

Figure 5:
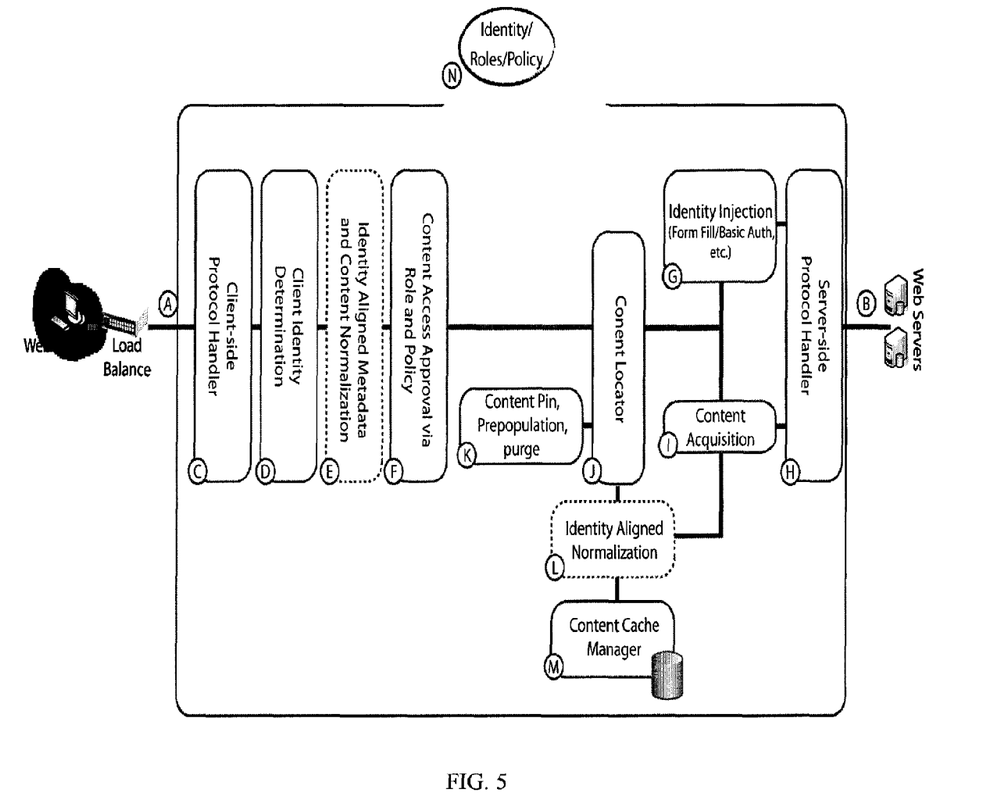
FIG. 5 is a diagram of example interaction between components of an identity-based address normalization system, according to an example embodiment.

FIG. 5 is a diagram of example interaction between components of an identity-based address normalization system, according to an example embodiment.

Traffic arrives via A where it is handled according to the protocol (C) and then associated with an identity at D. The mechanism of acquiring the identity can be achieved via an identity service, such as the identity services discussed and incorporated by reference herein and above.

At E, the techniques discussed above with respect to FIGS. 1-4 are applied to both metadata and content as per policy. Note that this modification is performed on a client-side or an incoming request.

In some embodiments, proxy service access to content is controlled according to identity-based restrictions at F.

Some proxy mechanism can also have an associated cache. If so, then J is interrogated to see if the content is already in the cache, and if so, then the techniques discussed herein and above are applied to the request and the content at L; and the content is retrieved from M and then vended back to the web client.

If there is no cache associated with the proxy or if the content is not in the cache, I is used to acquire the content via H and B. Sometimes G may be used to inject identity into the request to acquire the content.

When the content is acquired it is stored in the cache via L (which uses the mechanism above) and M. The content is then vended as before.

The techniques presented herein an above demonstrate that once an URL has been normalized it can be evaluated to determine if this path is allowed for the given authenticated user (principal) and services can be properly applied to it.

Typically finding and Normalizing a "../" (path altering attribute in a principal-supplied address) is relatively straightforward. But the "../" can be masked in numerous different ways. Take the following for example.

Fully Escaped
   %2e%2e%2f
UCS-2 Unicode Escaped Version
   %u002e%u002e%u002f
2-byte UTF-8 Overlong Escaped Version
   %c0%ae%c0%ae%c0%af
3-byte UTF-8 Overlong Escaped Version
   %e0%80%ae%e0%80%ae%e0%80%af
4-byte UTF-8 Overlong Escaped Version
   %f0%80%80%ae%f0%80%80%ae%f0%80%80%af
5-byte UTF-8 Overlong Escaped Version
   %f8%80%80%80%ae%f8%80%80%80%ae%f8%80%80%80%af
6-byte UTF-8 Overlong Escaped Version
   %fc%80%80%80%80%ae%fc%80%80%80%80%ae%fc%80%80%-
   80%80%af
Percent u encoded
   %25u002E%25u002E/
Ghost Characters
   ...../
Ghost Characters
   ..///////////

All of these are potential different ways that a hacker can utilize the "../" in an attempt to bypass the URL normalization matching. The techniques presented herein and above address this by making the pattern detection identity-specific and making pattern detection capable of being dynamically enforced and implemented in real time.

Thus, the techniques presented herein include a variety of benefits over conventional approaches, such as, but not limited to: providing the ability to dynamically alter the pattern matching of a URL Normalization procedure without an update to the underlying source code; allowing the ability to instantaneously update a URL Normalization procedure based upon newly found vulnerabilities within a product offering; providing a listing of currently suggested URL pattern match's to detect all currently know malicious input possibilities; providing the ability to perform URL Normalization in one respect to one proxy service and providing a different URL Normalization to another proxy service; and providing the ability to do all of the above via identity-based policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing in a non-transitory machine-readable medium and to execute on a machine, comprising:
   receiving, by the machine, an electronic address for accessing a resource, the electronic address is received from a principal for purposes of gaining access to the resource;
   resolving, by the machine, a resource identity for the resource and a principal identity for the principal;
   determining, by the machine, a set of patterns that the electronic address can be represented as based on the resource identity and the principal identity, the set of patterns are identity-based and determined based on the resource identity and the principal identity, and the set of patterns include constant and hard coded information along with variable and regular expression information, one or more of said patterns being dynamically defined in real time;
   attempting, by the machine, to match the electronic address against the set of patterns when policy dictates;
   normalizing, by the machine, the electronic address in response to a matched pattern into a normalized address, the normalized address is to a location for the principal to retrieve the resource based on the principal identity and the resource identity;
   querying the address pattern repository using the principal identity for the principal and the resource identity for the resource; and
   enforcing, by the machine, one or more actions against the principal before directing the principal to the resource for access in response to the normalized address, the normalized address permits designated services to process the one or more actions before the principal accesses the resource via the location identified in the normalized address and the designated services customized based on the principal identity and the resource identity and the one or more actions affect security to access the resource, auditing with respect to accessing the resource, and load balancing for the resource when the resource is accessed at the location.

2. The method of claim 1, wherein receiving further includes receiving the electronic address via a WWW browser in response to a principal supplied or activated link, within the WWW browser, representing a Uniform Resource Locator (URL) link or Universal Resource Identifier (URI) link.

3. The method of claim 1, wherein receiving further includes receiving the electronic address in response to a Hypertext Transfer Protocol (HTTP) command or a File Transfer Protocol (FTP) command issued from the principal to access the resource.

4. The method of claim 1, wherein resolving further includes consulting a remote identity service to supply authentication services or identity-resolution services for resolving the resource identity and the principal identity.

5. The method of claim 1, wherein said determining comprises dynamically defining said one or more address patterns in real time by an administrator, and further includes accessing a pattern repository with at least one of the resource identity and the principal identity to acquire the set of patterns.

6. The method of claim 1, wherein attempting further includes bypassing the matching when the policy permits for the principal and in response to the principal identity for the principal and considering the principal supplied electronic address to be matched and the normalized address.

7. The method of claim 1, wherein attempting further includes bypassing the matching when the policy permits for the resource and in response to the resource identity and considering the principal supplied electronic address to be matched and the normalized address.

8. A machine-implemented method residing in a non-transitory machine-readable medium and to execute on a machine, comprising:
   acquiring, by the machine, an address pattern for referencing a resource, wherein the address pattern is tied and customized to a principal identity for a principal attempting to access the resource and tied and customized to a resource identity for the resource and the address pattern includes constant and hard coded information along with variable and regular expression information, said address pattern being dynamically defined in real time;
   matching, by the machine, the address pattern to an electronic address supplied by the principal, wherein the principal is attempting to access the resource and the matching to the address pattern occurs based on and customized to the principal identity and the resource identity;
   normalizing, by the machine, the electronic address to a normalized address for the resource customized to and based on the principal identity and the resource identity, the normalized address being to a location for the principal to retrieve the resource based on the principal identity and the resource identity;
   querying an address pattern repository using the principal identity for the principal and the resource identity for the resource; and
   routing, by the machine, the principal to the resource via the normalized address and processing one or more designated services before the principal accesses the resource, the one or more designated services affect security with respect to accessing the resource, auditing with respect to accessing the resource, and load balancing when accessing the resource.

9. The method of claim 8, wherein acquiring further includes interacting with an administrator via a graphical user interface to receive the address pattern as the regular expression that defines the address pattern, said administrator defining the address pattern in real time.

10. The method of claim 9 further comprising, dynamically updating, by the machine, a repository of patterns with the address pattern when the administrator commits the address pattern for update.

11. The method of claim 8, wherein matching further includes using a set of additional patterns to compare against the electronic address before matching the electronic address to the address pattern.

12. The method of claim 8, wherein normalizing further includes receiving the modification instructions for producing the normalized address from the resource.

13. The method of claim 8, wherein normalizing further includes receiving modification instructions for producing the normalized address from a policy decision point service.

14. The method of claim 8, wherein normalizing further includes altering, modifying, or editing a path associated with the electronic address to produce the normalized address.

15. A machine-implemented method residing in a non-transitory machine-readable medium and to execute on a machine, comprising:
intercepting, by the machine, a Uniform Resource Locator (URL) address supplied by a principal and directed to a resource;
acquiring, by the machine, a principal identity for the principal and a resource identity for the resource that the principal is attempting to access via the URL address;
normalizing the URL address to a normalized address for the principal to retrieve the resource based upon the principal identity and the resource identity;
querying an address pattern repository using the principal identity for the principal and the resource identity for the resource;
accessing, by the machine, the address pattern repository in response to the principal identity and the resource identity to acquire a set of candidate patterns for references made to the resource, the candidate patterns being customized based on the principal identity and the resource identity and each of the candidate patterns includes constant and hard coded information along with variable and regular expression information, one or more of said candidate patterns being dynamically defined in real time;
comparing, by the machine, the set of candidate patterns against the URL address supplied by the principal;
matching, by the machine, a particular pattern to the URL address, the particular pattern being customized based on the principal identity and the resource identity;
processing, by the machine, an action in response to the particular pattern matched, the action processed when the principal uses the particular pattern to access the resource and before the principal is given access to the resource and the action affects security when accessing the resource.

16. The method of claim 15 further comprising, processing, by the machine, the method as a reverse proxy service for the resource.

17. The method of claim 15, wherein acquiring further includes asking an identity service to supply and verify the principal identity and the resource identity.

18. The method of claim 15, wherein accessing further includes dynamically obtaining at least one pattern in the set of patterns from an administrator in real-time, and wherein said administrator defines said one or more address patterns.

19. The method of claim 15, wherein processing further includes normalizing the URL address and enforcing access restrictions in response to a normalized URL address.

20. The method of claim 15, wherein processing further includes assigning access privileges to the resource in response to the principal identity.

21. A machine-implemented system, comprising:
an address pattern repository implemented in a non-transitory machine-accessible and readable medium and accessible to an address normalization service that processes address patterns included in the address pattern repository, the address patterns including constant and hard coded information along with variable and regular expression information, one or more of said address patterns being dynamically defined in real time; and
the address normalization service implemented in a non-transitory machine-accessible and readable medium to process on a machine, wherein the address normalization service is to process principal supplied addresses for resources by querying the address pattern repository using principal identities for the principals and resource identities for the resources to acquire selective and customized address patterns based on the principal identities and the resource identities, the customized address patterns are then attempted to be matched to the principal supplied addresses and when matches occur the principal supplied addresses are normalized into normalized addresses and policies applied before the principals are forwarded to the resources associated with the normalized addresses, the normalized addresses being to locations for a principal to retrieve a resource based on the principal identity and the resource identity, the normalized addresses and policies are customized based on the principal identities and the resource identities and when a particular principal uses a particular normalized address to access a particular resource a particular policy is enforced and one or more designated services are processed before access is given to the particular resource.

22. The system of claim 21 further comprising, an identity service that supplies or verifies the principal identities on behalf of the address normalization service, the identity service implemented and residing in a non-transitory machine-readable medium and to execute on the machine.

23. The system of claim 21, wherein at least some of said one or more address patterns are dynamically defined in real time by an administrator via a graphical user interface and dynamically updated to the address pattern repository and dynamically made available to the address normalization service.

24. The system of claim 21, wherein at least one policy assigns access rights to the resources or assigns roles to the principals for accessing the resources.

25. The system of claim 21, wherein the principal supplied addresses are received via a World-Wide Web (WWW) browser as Uniform Resource Locator (URL) references or Universal Resource Identifier (URI) references.

* * * * *